United States Patent [19]

Agnew

[11] 4,415,777
[45] Nov. 15, 1983

[54] HYBRID CIRCUIT INCLUDING CAPACITIVE CHARGE-TRANSFER MEANS
[75] Inventor: David G. Agnew, Ottawa, Canada
[73] Assignee: Northern Telecom Limited, Montreal, Canada
[21] Appl. No.: 323,541
[22] Filed: Nov. 20, 1981
[51] Int. Cl.³ ............................................. H04B 1/58
[52] U.S. Cl. ........................... 179/170 NC; 179/170 T
[58] Field of Search ..... 179/170 T, 170 NC, 170 HF; 178/63 R, 63 A; 370/28; 364/825; 333/173

[56] References Cited
U.S. PATENT DOCUMENTS
4,251,785  2/1981  Pfleiderer .............................. 333/173

FOREIGN PATENT DOCUMENTS
56-32837  4/1981  Japan ........................... 179/170 NC Primary Examiner—G. Z. Rubinson
Assistant Examiner—Randall P. Myers Attorney, Agent, or Firm—R. John Haley

[57] ABSTRACT

A hybrid circuit includes a capacitive charge-transfer arrangement, comprising parallel capacitors and series switches, for coupling signals in one or both directions between a four-wire line and a two-wire line. The switches are constituted by VMOS power FETs. In one embodiment, the charge-transfer arrangement is provided in the receive path to give the desired properties of electrical isolation and unbalanced to balanced conversion of receive path signals. Signals from the two-wire line are coupled to a transmit path of the four-wire line via an attenuating and high-pass filtering arrangement and a differential amplifier, thereby providing good common mode rejection of high voltage signals, especially at power line frequencies. In another embodiment, the charge-transfer arrangement is provided, commonly for the receive and transmit paths, for coupling the two-wire line to the remainder of the hybrid circuit.

19 Claims, 10 Drawing Figures

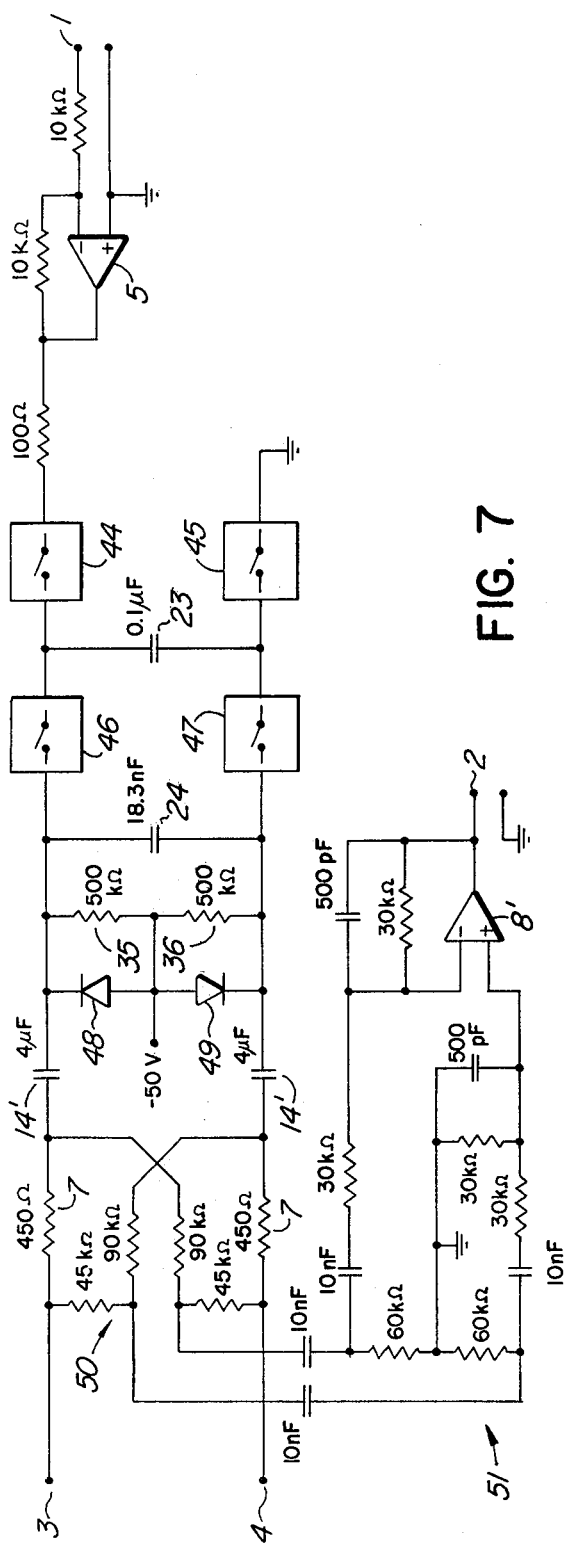
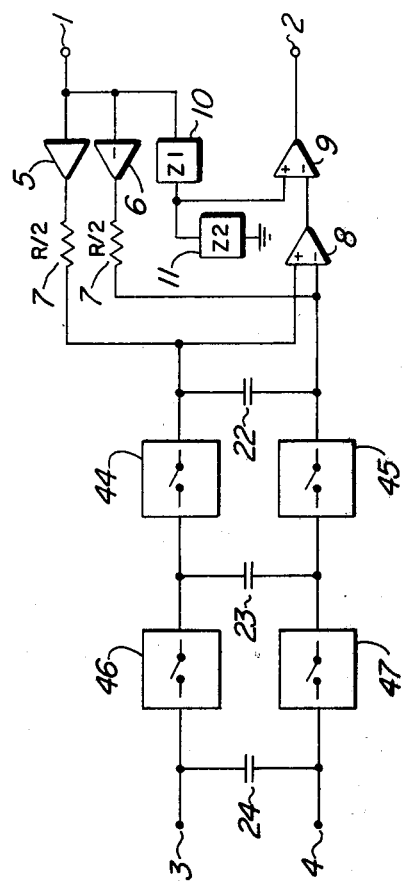
FIG. 7
FIG. 8

HYBRID CIRCUIT INCLUDING CAPACITIVE CHARGE-TRANSFER MEANS

This invention relates to hybrid circuits.

Numerous electronic hybrid circuits have been developed or proposed for replacing magnetic hybrids, or hybrid transformers, used to couple between four-wire and two-wire lines. Generally, however, such circuits do not satisfy the considerable demands placed on practical hybrids. In particular, known purely electronic hybrid circuits do not generally satisfy the combined practical requirements for high common mode (longitudinal signal) rejection, isolation of sensitive electronic components from high voltage common mode signals, conversion between balanced and unbalanced signals, and relatively low cost.

Accordingly, a need exists to provide an improved electronic hybrid circuit. An object of this invention is to provide a hybrid circuit which enables this need to be fulfilled.

According to one aspect of this invention there is provided a hybrid circuit comprising transmit path means, for coupling signals from a two-wire line to a transmit path of a four-wire line, and receive path means, for coupling signals from a receive path of the four-wire line to the two-wire line, wherein at least one of said transmit path means and said receive path means comprises capacitive charge-transfer means comprising a plurality of parallel capacitors, a plurality of series switches, and means for cyclically controlling said switches to transfer signals between two ports of said charge-transfer means whilst electrically isolating said ports from one another.

Thus in accordance with this invention a capacitive charge-transfer means is provided for coupling signals to and/or from the two-wire line. This charge-transfer means can be considered to be equivalent to an isolation transformer, providing the desired electrical isolation and conversion between unbalanced and balanced signals.

The switches of the charge-transfer means preferably comprise field effect transistors (FETs), preferably vertical metal-oxide-semiconductor (VMOS) FETs. In order to inhibit reverse-biasing of such transistors, the hybrid circuit preferably includes means for supplying a biasing potential to one of the ports of the charge-transfer means.

In an embodiment of the invention, in which the capacitive charge-transfer means is provided in the receive path means, said capacitive charge-transfer means comprises a first capacitor, a first pair of switches connected between the first capacitor and one of said ports constituting an input of said charge-transfer means, a second pair of switches connected between the first capacitor and the other of said ports constituting an output of said charge-transfer means, each switch of each pair of switches being connected to a respective terminal of the first capacitor, a second capacitor connected in parallel with the output of said charge-transfer means, and means for alternately opening and closing the first and second pairs of switches.

The capacitive charge-transfer means may also comprise a further capacitor connected in parallel with the input of the charge-transfer means. However, such a further capacitor has negligible effect, and may be dispensed with, if the input of the charge-transfer means is driven from a source of sufficiently low impedance at the switching frequency of the charge-transfer means.

In order to facilitate rapid charge-transfer via the charge-transfer means, preferably said capacitors have capacitances which decrease from the input to the output of the charge-transfer means.

The charge-transfer means effectively acts as an isolating transformer which operates down to zero frequency, or d.c. In order to isolate d.c. on the two-wire line, preferably the receive path means comprises capacitive coupling means for coupling the output of the charge-transfer means to the two-wire line.

In order to provide good rejection of high voltage common mode signals and to effect balanced to unbalanced conversion for the transmit path signals, preferably said transmit path means comprises amplifying means having differential inputs and having an output for supplying signals to the transmit path of the four-wire line, and attenuating and high-pass filtering means for coupling signals from the two-wire line to the differential inputs of said amplifying means.

In another embodiment of the invention said capacitive charge-transfer means is provided commonly to said transmit path means and said receive path means, one of the ports of the charge-transfer means serving for coupling to said two-wire line, said charge-transfer means comprising a first capacitor, a first pair of switches connected between the first capacitor and said one of the ports, a second pair of switches connected between the first capacitor and the other of said ports, each switch of each pair of switches being connected to a respective terminal of the first capacitor, a second capacitor connected in parallel with said one of said ports, a third capacitor connected in parallel with said other of said ports, and means for alternately opening and closing the first and second pairs of switches.

In this embodiment preferably said first capacitor has a capacitance which is at least four times the capacitance of each of said second and third capacitors.

Each switch can comprise a single VMOS FET of sufficiently high source-drain breakdown voltage, or it can comprise two VMOS FETs connected back-to-back, i.e. with their source-drain paths connected in series with one another with opposite polarities, to enable rejection of common mode voltages which are greater than the source-drain breakdown voltage of each of the individual VMOS FETs.

According to another aspect of the invention there is provided a hybrid circuit comprising an input port for connection to a receive path of a four-wire line, an output port for connection to a transmit path of the four-wire line, an input/output port for connection to a two-wire line, transmit path means for coupling signals from the two-wire line and present at the input/output port to the output port, and receive path means for coupling signals from the input port to the input/output port, wherein the receive path means comprises: a first capacitor; a first pair of switches for coupling the first capacitor to the input port, each switch of the first pair of switches being coupled to a respective terminal of the first capacitor; a second capacitor; a second pair of switches for coupling the second capacitor to the first capacitor, each switch of the second pair of switches being coupled between respective terminals of the first and second capacitors; means for alternately opening and closing said first and second pairs of switches in such manner that the first pair of switches is closed only when the second pair of switches is open, and the second pair of switches is closed only when the first pair of switches is open; each switch comprising at least one vertical metal-oxide-semiconductor field effect transistor (VMOS FET); means for supplying a biasing potential to each terminal of the second capacitor to inhibit reverse-biasing of each VMOS FET; and capacitive coupling means for coupling the second capacitor to the input/output port.

The means for alternately opening and closing the pairs of switches conveniently comprises a square wave generator and a pulse transformer having a primary winding coupled to an output of the square wave generator and four secondary windings each coupled to a respective one of the switches for controlling the open or closed state thereof, the windings coupled to the first pair of switches being oppositely poled with respect to the windings coupled to the second pair of switches.

The invention will be further understood from the following description with reference to the accompanying drawings, in which.

Figures 3, 4:
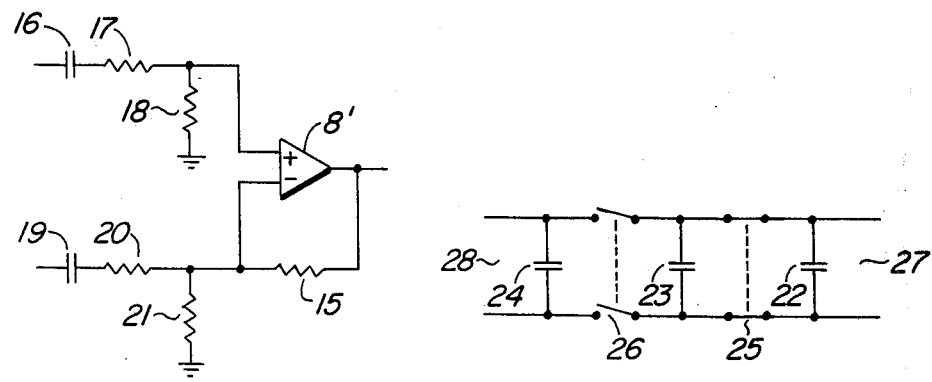
FIG. 3 illustrates a circuit arrangement which may be used to replace one of the transformers of FIG. 2.
FIG. 4 illustrates the form of a circuit which can be used in accordance with the invention to replace the other of the transformers of FIG. 2.
Figure 5:
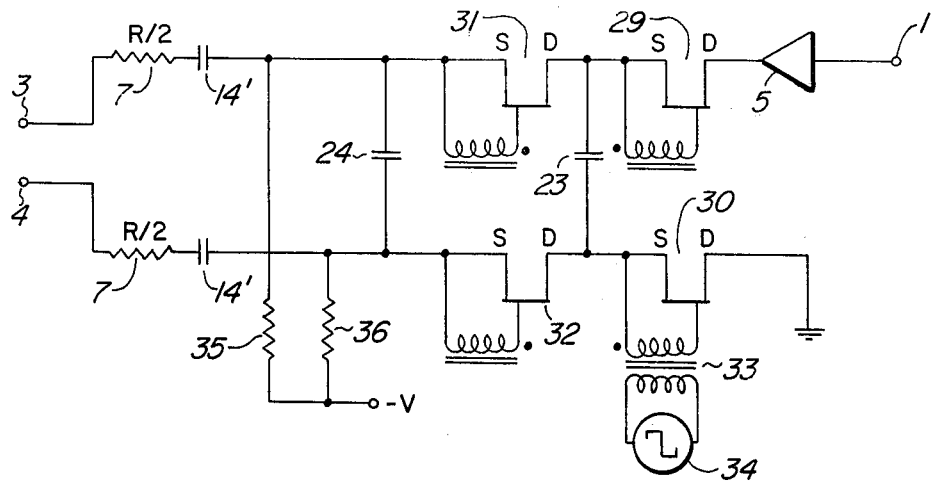
FIG. 5 illustrates parts of a hybrid circuit in accordance with an embodiment of the invention.
Figure 6A:
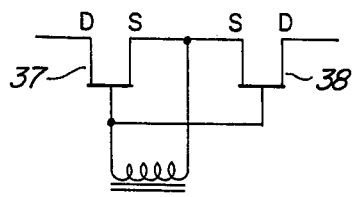
Figure 6B:
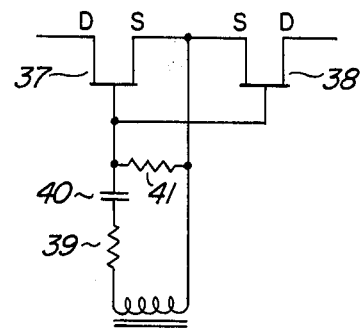
Figure 6C:
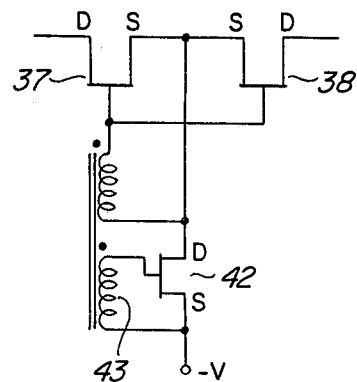

FIGS. 6A, 6B, and 6C illustrate alternative forms of switches which may be used in the circuits of FIGS. 4 and 5;

FIG. 7 illustrates a hybrid circuit in accordance with another embodiment of the invention; and FIG. 8 illustrates a hybrid circuit in accordance with a further embodiment of the invention.

Similar references are used to denote similar components in the different Figures of the drawings.

Figure 1:
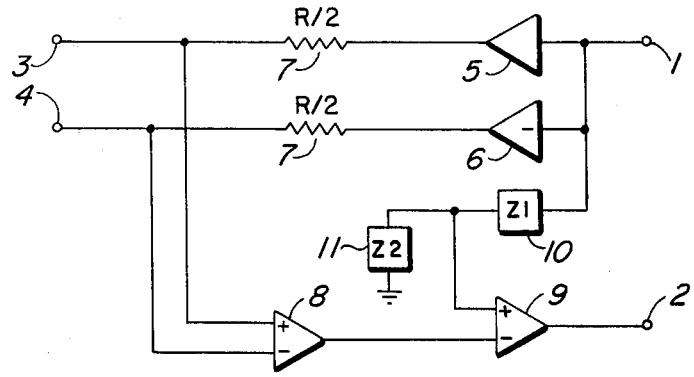
FIG. 1 illustrates a known form of electronic hybrid circuit.

Referring to the drawings, FIG. 1 shows a known form of electronic hybrid circuit which serves to couple terminals 1 and 2, which in use are coupled to the receive and transmit paths, respectively, of a four-wire transmission path, to terminals 3 and 4, which in use are coupled to the tip and ring wires, respectively, of a balanced two-wire telephone subscriber line of nominal impedance R. The receive path terminal 1 is coupled to the terminals 3 and 4 via non-inverting and inverting, respectively, unity gain buffer amplifiers 5 and 6, respectively, and line matching resistors 7 each of resistance R/2. The terminals 3 and 4 are coupled to the inputs of a unity gain differential amplifier 8, whose output is connected to the inverting input of a unity gain differential amplifier 9 whose output is coupled to the transmit path terminal 2. A potential divider comprising impedances 10 and 11 of magnitudes Z1 and Z2 respectively is connected between the terminal 1 and circuit ground and has its tapping point connected to the non-inverting input of the differential amplifier 9 to provide the desired transhybrid loss.

The simple circuit of FIG. 1 suffers from a serious disadvantage in that the two amplifiers 5 and 6, which are required in order to achieve unbalanced to balanced conversion from the terminal 1 to the terminals 3 and 4, provide a low impedance path, to ground through the resistors 7, for common mode currents. Furthermore, the full common mode voltages at the terminals 3 and 4 are present at the inputs of the amplifier 8. Although the amplifier 8 may have excellent common mode rejection for input voltage swings less than the amplifier supply voltages, typically 15 volts, this range is insufficient in practice, when large common mode voltage swings, particularly due to induction from power lines, may be present at the terminals 3 and 4.

In addition, in the circuit of FIG. 1 the amplifiers are not sufficiently protected from large transient signals, for example due to lightning, which may occur on the two-wire line and be applied to the terminals 3 and 4.

Figure 2:
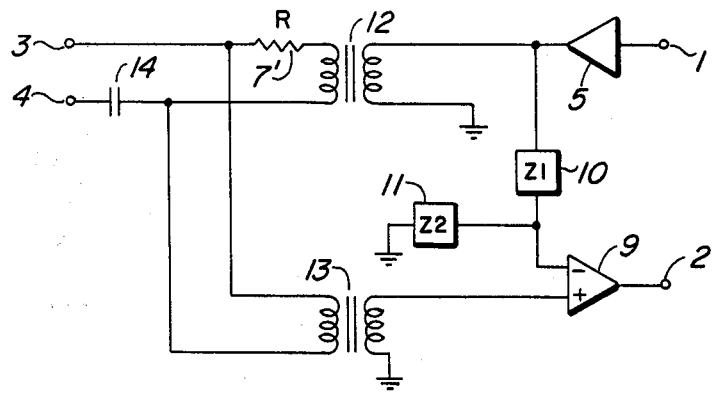
FIG. 2 illustrates an improved form of electronic hybrid circuit including two transformers.

These disadvantages are avoided by the circuit of FIG. 2, in which the amplifiers 6 and 8 are replaced by 1:1 isolating transformers 12 and 13, respectively, which respectively effect unbalanced to balanced conversion from the output of the buffer amplifier 5 to the terminals 3 and 4, and balanced to unbalanced conversion from the terminals 3 and 4 to the non-inverting input of the amplifier 9. In this circuit the potential divider 10, 11 is connected to the output of the amplifier 5 and to the inverting input of the amplifier 9, the balanced side of the transformer 12 is coupled to the terminals 3 and 4 via a line-matching resistor 7' of resistance R, and both transformers 12 and 13 are coupled to the terminals 3 and 4 via a d.c. blocking capacitor 14. The unbalanced sides of the transformers 12 and 13 are connected between the respective terminals of the amplifiers 5 and 9 and circuit ground.

Although the circuit of FIG. 2 avoids the above disadvantages of the circuit of FIG. 1, it has the disadvantage of requiring the isolating transformers 12 and 13.

The transformer 13 can be replaced either in the same manner as described below for replacement of the transformer 12 or, more conveniently, by a circuit such as that shown in FIG. 3. In the circuit of FIG. 3, a differential amplifier 8' is provided whose output is coupled to the input of the amplifier 9 in FIG. 2, and is connected to the inverting input of the amplifier 8' via a resistor 15. The terminal 3 is coupled to the non-inverting input of the amplifier 8' via a capacitor 16 and a potential divider comprising resistors 17 and 18. Similarly, the terminal 4 is coupled to the inverting input of the amplifier 8' via a capacitor 19 and a potential divider comprising resistors 20 and 21. The resistances of the resistors in the circuit of FIG. 3 are chosen to provide an overall unity gain for the circuit but to attenuate common mode signals applied to the inputs of the amplifier 8'. For example the resistances of the resistors 15, 17, and 20 could be three times, and the resistance of the resistor 21 could be one-and-a-half times, the resistance of the resistor 18, to attenuate common mode signals passing from the terminals 3 and 4 to the amplifier inputs by a factor of 4. In addition, the capacitances of the capacitors 16 and 19 are selected to form with the resistors an input high-pass filter having a 3 dB cut-off frequency of, for example, 300 Hz to allow passage of voiceband signals. This filter provides an additional common mode signal attenuation of more than 12 dB at power line frequencies of 60 Hz or less. Further low frequency common mode attenuation can be provided by additional filtering as desired.

Thus the circuit of FIG. 3 enables the transformer 13 of FIG. 2 to be dispensed with, whilst still providing adequate common mode rejection by attenuating common mode signals to be less than the supply voltages of the amplifier 8' at the amplifier inputs, and providing adequate isolation of the amplifier 8' from the terminals 3 and 4.

The transformer 12 of FIG. 2 cannot, however, be replaced in a similar manner. Accordingly, the present invention provides a capacitive charge-transfer arrangement as shown in FIG. 4 to replace the transformer 12.

Referring to FIG. 4, the capacitive charge-transfer arrangement comprises parallel capacitors 22, 23, and 24 which are coupled together via pairs of series switches 25 and 26 which are cyclically or alternately opened and closed to transfer signals between a port 27 and a port 28 while isolating the ports from one another. The charge-transfer arrangement can operate to couple signals in either or both directions between the ports 27 and 28. For example for coupling signals in one direction from the port 27 to the port 28, the capacitors 22, 23, and 24 have progressively decreasing capacitances from the capacitor 22 to the capacitor 24. Then as shown in FIG. 4, with the switch pair 25 closed and the switch pair 26 open, a signal at the port 27 and present across the capacitor 22 is applied to the capacitor 23. Subsequently, with the switch pair 25 open and the switch pair 26 closed, the signal is applied from the capacitor 23 to the capacitor 24 and hence to the port 28. A unidirectional charge-transfer arrangement is used in the hybrid circuits described below with reference to FIGS. 5 and 7.

A bidirectional charge-transfer arrangement is used in the hybrid circuit described below with reference to FIG. 8. In a bidirectional charge-transfer arrangement, preferably the middle capacitor 23 has a greater capacitance than, for example at least four times as great as the capacitance of, each of the capacitors 22 and 24.

In each charge-transfer arrangement, in order to handle voiceband signals, the switch pairs are preferably operated at a frequency in the range from 15 kHz to 200 kHz, although lower or higher frequencies could be used. In order to maintain isolation of the ports 27 and 28 from one another, the switch pairs are operated in break-before-make fashion.

Whilst other forms of switches could be used, in preferred embodiments of the invention the switches forming the switch pairs 25, 26 comprise VMOS FETs (Vertical Metal-Oxide-Semiconductor Field-Effect Transistors). VMOS power FETs enable the desired characteristics of low on resistance, high off resistance, high breakdown voltage, break-before-make operation, high switching speed, and convenient drive circuitry to be provided as further described below.

FIG. 5 shows the receive parts of a hybrid circuit which comprises four VMOS power FETs 29, 30 and 31, 32 to constitute the switch pairs 25 and 26 respectively. The transistors 29 to 32 are for example Signetics quad FETs type VQ1000CJ. The output of the amplifier 5 is connected to the drain D of the transistor 29, whose source S is connected to the drain D of the transistor 31 and to one side of the capacitor 23. The other side of the capacitor 23 is connected to the drain D of the transistor 32 and to the source S of the transistor 30, whose drain D is connected to circuit ground. In FIG. 5 the capacitor 22 is dispensed with because it has a small or negligible effect in view of the low output impedance of the amplifier 5; however this capacitor 22 could also be provided in this circuit.

The sources S of the transistors 31 and 32, between which the capacitor 24 is connected, are coupled via respective d.c. blocking capacitors 14' and line-matching resistors 7 to the terminals 3 and 4 respectively. In order to control the transistors 29 to 32 each transistor has connected between its source S and its gate a respective secondary winding of a pulse transformer 33, whose primary winding is supplied with the output of a square wave generator 34. The secondary windings have relative polarities as shown by dots in FIG. 5 to cause the switch pairs 29, 30 and 31, 32 to conduct alternately at the frequency, for example 100 kHz, of the generator 34 as described above. The arrangement provides very good unbalanced to balanced conversion, and correspondingly good common mode rejection.

Although the arrangement of FIG. 5, and those described below, still requires a pulse transformer 33, this can be provided very cheaply because this is not a large or critical component, it has a very low power requirement, and is merely required in order to electrically isolate the transistors 29 to 32 from the generator 34. Instead of a pulse transformer other electrically isolating coupling means, such as optocouplers, could be used to couple the generator 34 to the transistors.

If the transistors become reverse biased (drain negative with respect to source), they tend to conduct regardless of the control voltage applied to their gates. In order to overcome this problem, in the circuit of FIG. 5 the sources S of the transistors 31 and 32 are connected via respective resistors 35 and 36, each of at least 100 kΩ resistance, to a negative bias supply −V. When the transistors 31 and 32 conduct this bias is supplied to the sources of the transistors 29 and 30, and when the transistors 29 and 30 conduct they supply the circuit ground potential of 0 volts to the drains of the transistors 31 and 32, so that reverse biasing of the transistors which at any time are not controlled to be conductive is inhibited. Desirably the bias −V is selected to be half the drain-gate breakdown voltage Vb of the transistors to allow a common mode voltage swing of about Vb volts peak to peak to be accommodated.

For the transistor type mentioned above, Vb=60 volts. However, it is desirable to be able to accommodate a greater common mode voltage swing than this. This can be achieved using different transistors with higher breakdown voltages Vb, or by using two transistors, with their source-drain paths in series and oppositely poled to one another, for each individual switch. Several such arrangements with alternative drive circuits are shown in FIGS. 6A to 6C, each of which shows the components required for each individual one of the four switches in FIG. 4 or 5.

FIG. 6A shows a simple arrangement of two VMOS FETs 37 and 38 with their sources S connected together, their drains D constituting the terminals of the switch, and their gates commonly controlled by a single secondary winding of the transformer 33. Such a drive arrangement is suitable if the transistors 37 and 38 do not include zener protection diodes between their gates and sources. If the transistors have such diodes, then the drive circuitry can be as shown in FIG. 6B, including a series resistor 39 and capacitor 40 between the transformer winding and the transistor gates, and a parallel resistor 41 between the gates and sources of the transistors. The components 39 to 41 can typically have values of 900Ω, 1 nF, and 100 kΩ respectively.

The arrangements of FIGS. 6A and 6B still have the disadvantage that the transistors have a relatively low off impedance when their drains are only a few volts positive with respect to their sources. The bias arrangement of FIG. 5, comprising the bias supply and the resistors 35 and 36, may be advantageously combined with the arrangements of FIGS. 6A and 6B to overcome this problem. Alternatively an arrangement such as that shown in FIG. 6C may be provided. This arrangement requires a third VMOS FET 42 for each switch, and an additional transformer winding 43 and the bias supply.

FIG. 7 illustrates in detail a hybrid circuit having four switches 44, 45, 46, and 47 each of which is shown schematically but has the form shown in FIG. 6B. The switches are driven to conduct alternately in pairs, as described above with reference to FIGS. 4 and 5. In FIG. 7 typical component values are shown for the various components, assuming that the two-wire line connected in use to the terminals 3 and 4 has a nominal resistive impedance of 900Ω.

As shown in FIG. 7, the capacitor 22 is omitted, and the capacitors 23 and 24 have successively decreasing values to provide for rapid charge-transfer. To accommodate a common mode voltage swing of about 100 volts, the biasing arrangement of FIG. 5 is provided in the circuit of FIG. 7, with the resistors 35 and 36, a −50 volt bias supply, and clamping diodes 48 and 49.

The transmit parts of the hybrid circuit of FIG. 7 differ from those described with reference to FIGS. 1 to 3 in that a resistive hybrid 50 is used to derive attenuated signals from the terminals 3 and 4, and these signals are supplied to the inputs of the differential amplifier 8' via a high pass filter network 51. In this arrangement the impedances 10 and 11, and consequently also the amplifier 9, are dispensed with, the output of the amplifier 8' being applied directly to the terminal 2. This arrangement may be readily modified for two-wire lines whose impedances differ widely from being 900Ω resistive, by changing the resistances of the hybrid 50 and the resistors 7 and/or replacing the hybrid 50 with a hybrid comprising complex impedances.

FIG. 8 illustrates a hybrid circuit in accordance with a further embodiment of the invention in which the charge-transfer arrangement, comprising the capacitors 22, 23, and 24 and the four switches 44 to 47 which are shown schematically but can take any of the forms described above, is coupled between the terminals 3 and 4, to which the two-wire line is connected, and a hybrid circuit of the known form shown in FIG. 1. The charge-transfer arrangement couples signals in both directions to and from the two-wire line, and accordingly the capacitor 23 is provided with a capacitance which is at least four times the capacitance of the capacitors 22 and 24, as already described. The capacitors 22 and 24 have, for example, equal capacitances. The switches 44 to 47 are driven to conduct alternately in pairs, as already described. The known form of the hybrid circuit operates in conventional manner except that it is isolated from the two-wire line by the charge-transfer arrangement. Obviously, any other known form of hybrid circuit could be used in the circuit of FIG. 8 in place of the FIG. 1 type of hybrid circuit shown.

Whilst particular embodiments of the invention have been described in detail, the invention is not limited to the details thereof, and numerous modifications, variations, and adaptations may be made without departing from the scope of the invention as defined in the claims. In particular it is observed that, although as described above the charge-transfer arrangement is provided in the receive signal path from the terminal 1 to the terminals 3 and 4, or commonly in both signal paths to and from the terminals 3 and 4, it could if desired be provided only in the transmit path from the terminals 3 and 4 to the terminal 2. Furthermore, separate charge-transfer arrangements could if desired be provided in the receive and transmit paths.

What is claimed is:

1. A hybrid circuit comprising transmit path means, for coupling signals from a two-wire line to a transmit path of a four-wire line, and receive path means, for coupling signals from a receive path of the four-wire line to the two-wire line, wherein at least one of said transmit path means and said receive path means comprises capacitive charge-transfer means comprising a plurality of parallel capacitors, a plurality of series switches, and means for cyclically controlling said switches to transfer signals between two ports of said charge-transfer means whilst electrically isolating said ports from one another.

2. A hybrid circuit as claimed in claim 1 wherein said switches comprise field effect transistors (FETs).

3. A hybrid circuit as claimed in claim 2 wherein said switches comprise vertical metal-oxide-semiconductor (VMOS) FETs.

4. A hybrid circuit as claimed in claim 3 and including means for supplying a biasing potential to one of the ports of the charge-transfer means to inhibit reverse-biasing of the VMOS FETs.

5. A hybrid circuit as claimed in claim 1 wherein said capacitive charge-transfer means is provided in said receive path means.

6. A hybrid circuit as claimed in claim 5 wherein said capacitive charge-transfer means comprises a first capacitor, a first pair of switches connected between the first capacitor and one of said ports constituting an input of said charge-transfer means, a second pair of switches connected between the first capacitor and the other of said ports constituting an output of said charge-transfer means, each switch of each pair of switches being connected to a respective terminal of the first capacitor, a second capacitor connected in parallel with the output of said charge-transfer means, and means for alternately opening and closing the first and second pairs of switches.

7. A hybrid circuit as claimed in claim 6 wherein said capacitive charge-transfer means comprises a further capacitor connected in parallel with the input of said charge-transfer means.

8. A hybrid circuit as claimed in claim 6 or 7 wherein said capacitors have capacitances which decrease from the input to the output of the charge-transfer means.

9. A hybrid circuit as claimed in claim 6 or 7 wherein the receive path means comprises capacitive coupling means for coupling the output of the charge-transfer means to the two-wire line.

10. A hybrid circuit as claimed in claim 5, 6, or 7 wherein said transmit path means comprises amplifying means having differential inputs and having an output for supplying signals to the transmit path of the four-wire line, and attenuating and high-pass filtering means for coupling signals from the two-wire line to the differential inputs of said amplifying means.

11. A hybrid circuit as claimed in claim 1 wherein said capacitive charge-transfer means is provided commonly to said transmit path means and said receive path means, one of the ports of the charge-transfer means serving for coupling to said two-wire line, said charge-transfer means comprising a first capacitor, a first pair of switches connected between the first capacitor and said one of the ports, a second pair of switches connected between the first capacitor and the other of said ports, each switch of each pair of switches being connected to a respective terminal of the first capacitor, a second capacitor connected in parallel with said one of said ports, a third capacitor connected in parallel with said other of said ports, and means for alternately opening and closing the first and second pairs of switches.

12. A hybrid circuit as claimed in claim 11 wherein said first capacitor has a capacitance which is at least four times the capacitance of each of said second and third capacitors.

13. A hybrid circuit as claimed in claim 6, 7, or 12 wherein each switch in each pair of switches comprises a vertical metal-oxide-semiconductor field effect transistor.

14. A hybrid circuit as claimed in claim 6, 7, or 12 wherein each switch in each pair of switches comprises two vertical metal-oxide-semiconductor field effect transistors having their source-drain paths connected in series with one another with opposite polarities.

15. A hybrid circuit comprising an input port for connection to a receive path of a four-wire line, an output port for connection to a transmit path of the four-wire line, an input/output port for connection to a two-wire line, transmit path means for coupling signals from the two-wire line and present at the input/output port to the output port, and receive path means for coupling signals from the input port to the input/output port, wherein the receive path means comprises:
 a first capacitor;
 a first pair of switches for coupling the first capacitor to the input port, each switch of the first pair of switches being coupled to a respective terminal of the first capacitor;
 a second capacitor;
 a second pair of switches for coupling the second capacitor to the first capacitor, each switch of the second pair of switches being coupled between respective terminals of the first and second capacitors;
 means for alternately opening and closing said first and second pairs of switches in such manner that the first pair of switches is closed only when the second pair of switches is open, and the second pair of switches is closed only when the first pair of switches is open;
 each switch comprising at least one vertical metal-oxide-semiconductor field effect transistor (VMOS FET);
 means for supplying a biasing potential to each terminal of the second capacitor to inhibit reverse-biasing of each VMOS FET; and
 capacitive coupling means for coupling the second capacitor to the input/output port.

16. A hybrid circuit as claimed in claim 15 wherein each switch comprises two VMOS FETs having their source-drain path connected in series with their sources electrodes connected together.

17. A hybrid circuit as claimed in claim 16 wherein the two VMOS FETs of each switch have their gate electrodes interconnected, and wherein each switch includes a drive circuit for the FETs comprising a series-connected resistor and capacitor connected to said gate electrodes, and a resistor connected between said gate and source electrodes.

18. A hybrid circuit as claimed in claim 15, 16, or 17 wherein the means for alternately opening and closing the pairs of switches comprising a square wave generator and a pulse transformer having a primary winding coupled to an output of the square wave generator and four secondary windings each coupled to a respective one of the switches for controlling the open or closed state thereof, the windings coupled to the first pair of switches being oppositely poled with respect to the windings coupled to the second pair of switches.

19. A hybrid circuit as claimed in claim 15, 16, or 17 wherein the transmit path means comprises amplifying means having differential inputs and having an output coupled to the output port, and attenuating and high-pass filtering means coupling the input/output port to the differential inputs of said amplifying means.

* * * * *